Dec. 5, 1933.    R. J. NORTON    1,938,349
ELECTRICAL BRAKE TESTER
Filed March 5, 1929
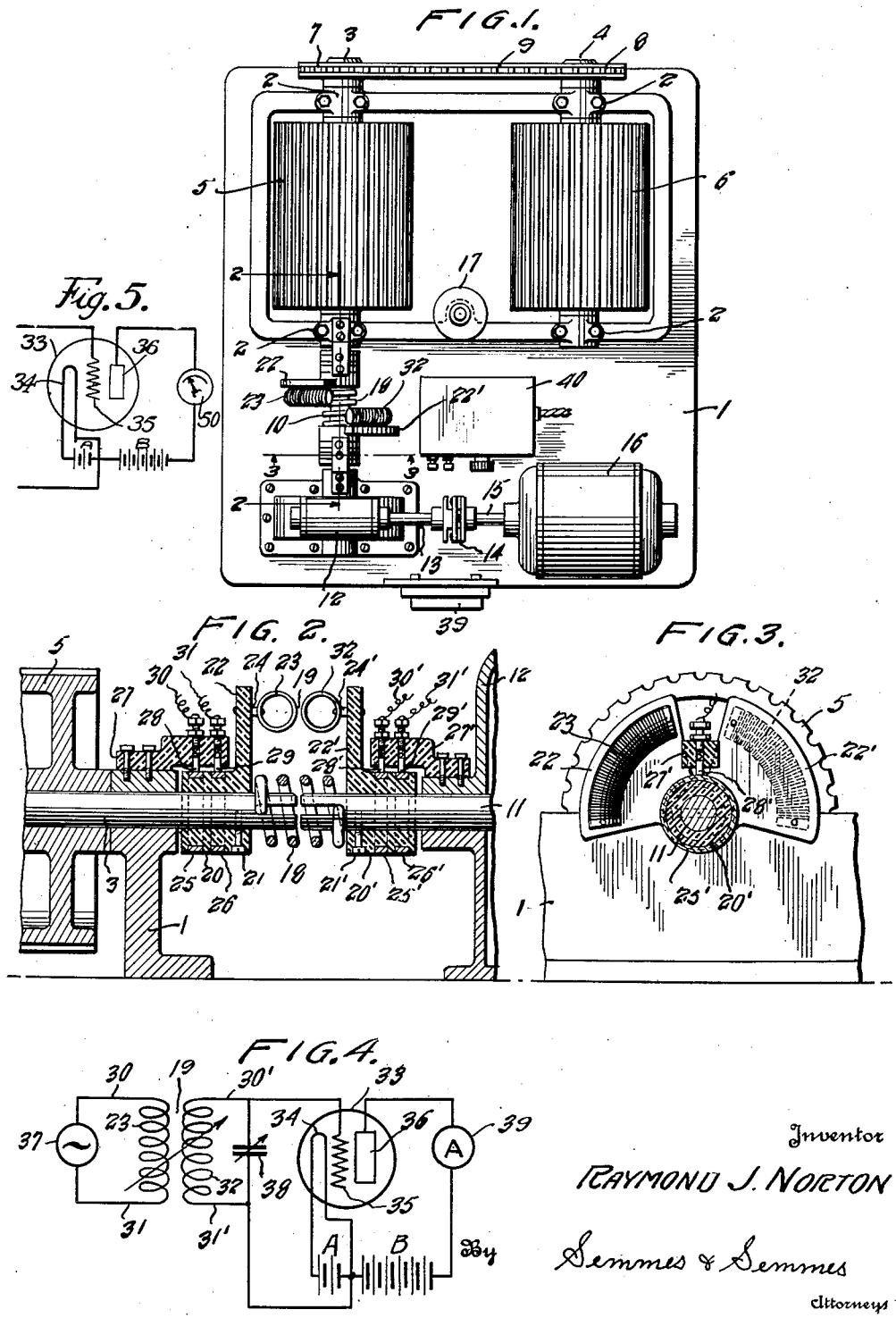

Patented Dec. 5, 1933

1,938,349

UNITED STATES PATENT OFFICE 1,938,349

ELECTRICAL BRAKE TESTER

Raymond J. Norton, Washington, D. C., assignor, by mesne assignments, to Bendix-Cowdrey Brake Tester, Inc., New York, N. Y., a corporation of Delaware Application March 5, 1929. Serial No. 344,575

2 Claims. (Cl. 265—25)

This invention relates in general to brake testing apparatus and more particularly has reference to a method and apparatus for electrically determining the efficiency of brake mechanisms.

Several methods for measuring the retarding force exerted by brakes of automotive vehicles and apparatus for effecting the methods have been devised. Some of these methods heretofore developed have been susceptible of operation by mechanical means embodying a driving element, usually an electric motor, and a mechanical transmisison from the motor to a pair of rollers which rotate the vehicle wheel against the resistance of its brake. This device generally includes a transmission dynamometer interposed between the source of power and the braking mechanism which serves to measure the reaction force or the torque imposed on the testing assemblage by the aplication of the brake of a given wheel.

These mechanisms are necessarily quite complicated and involve complex structures embodying a multiplicity of parts, and hence necessitate relatively high installation and upkeep costs. It is obvious that with complex mechanical devices employing a multiplicity of operating parts the liability of break-downs is relatively great. Also, as a result of the complexity of structure the frictional losses in the mechanism are high, and the power required to operate the mechanism is correspondingly great. It will also be understod that in complex mechanical structures employing a multiplicity of parts, and particularly heavy parts, such as are necessary in devices for testing the efficiency of automotive vehicle brakes, the frictional losses are so high that the sensitivity, and consequently the value, of the testing device is very low. As is well known in the automotive industry, it is necessary that the brakes of a vehicle be accurately adjusted and equalized to insure proper braking action and to prevent skidding of the vehicle when braked, particularly at high speeds. The necessity of accurate brake adjustments has been found to increase with the increased use of four-wheel brakes.

The purpose of the present invention is to increase the efficiency of testing structures by minimizing the frictional losses, and to effect installing and operating economy by simplifying the physical structure, and consequently increasing the sensitivity of the structure as a whole. To accomplish this result it has been found necessary to depart entirely from the heretofore methods of testing, which utilized a mechanical apparatus for receiving, transmitting and recording the braking torque created by the application of the brakes on the vehicle being tested. Because of the above pointed out and other inherent disadvantages in testers of the mechanical type, there is a pressing need for an accurate, sensitive, simple and reliable means for measuring brake resistance. The present invention, therefore, resides in the method and means of testing the brakes on automotive vehicles, which will eliminate the use of the hereinbefore described complicated mechanical devices. This invention is carried into effect by providing for electrically measuring the efficiency of vehicle brakes.

An object of this invention, therefore, is to provide a simple but accurate and sensitive method for determining the retarding force exerted by the braking mechanism of automotive vehicles.

Another object of this invention is to provide an apparatus to measure the resistance of an automotive vehicle brake by measuring a quantity, the value of which is affected by a mechanical effect produced by the application of a brake.

Another object of this invention is to provide a method and means for electrically testing automotive vehicle brake mechanisms.

Yet another object of this invention is to provide apparatus for testing brakes of automotive vehicles in which the mechanical effect produced by applying the brake mechanism is transmitted to a device for affecting electrical energy in a circuit associated with the testing apparatus.

Still another object of this invention is to provide a method and means for transmuting a mechanical braking effect into a variation in the characteristics of an electron tube circuit, and indicating the variations as representative of the braking effect.

A still further object of this invention is to provide a method and apparatus for testing brakes of automotive vehicles, in which the mechanical effect produced by the application of brakes is transmitted to a variable inductance which is used to vary the frequency of an electric current flowing through a circuit, and in which variations in frequencies are indicated as retardation effects.

With these and other objects in view, which may be incident to my improvements, the invention consists in the concept of utilizing a mechanical effect of brake application to control electrical energy such as the quantity of electrical current flowing from a source through a circuit, or the frequency of an electric current, and then measuring the effect of the control as hereinafter set forth and claimed, with the understanding that the several necessary features of my invention may be varied without departing from the spirit and scope of the appended claims.

In order to make my invention more clearly understood, I have shown in the accompanying drawing means for carrying the same into practical effect, without limiting the improvements in their useful applications to the particular constructions, which for the purpose of explanation, have been made the subject of illustration.

In the drawing:

Figure 1 is a plan view of a brake testing machine constructed in accordance with my invention.

Figure 2 is a detailed sectional view taken on line 2—2 of Figure 1, showing the mechanism for varying the inductance of an inductance unit.

Figure 3 is a sectional view taken on line 3—3 of Figure 1.

Fig. 4 is a diagrammatic illustration of an electrical circuit associated with the testing machine.

Figure 5 is a diagrammatic illustration of a portion of an electrical circuit associated with a modified form of the testing machine.

Brake mechanisms are provided on automotive vehicles primarily to decelerate the speed of the vehicle. In the present practice, brake mechanisms are provided directly on the ground wheels of the vehicle, or on shafts directly connected with all or certain of the ground wheels. The immediate and direct result of the operation of the braking mechanism is a decrease in the angular velocity of the brake-controlled ground wheels. Upon applying a light force to the brake-operating device, the deceleration will be relatively and correspondingly small; however, upon increasing the force applied to the brake-operating device, the deceleration effect of the brake mechanism will be proportionately increased. The preceding is, of course, based on the assumption that possible variables, such as the coefficient of friction between the drum and the braking element, the brake mechanism, etc., be maintained substantially constant.

The present specific embodiment of the invention comprises measuring a quantity which is a derivative of the increase in torque in a transmission shaft driving a given wheel, which itself results from the application of a given retarding force to the wheel. In particular, the present embodiment comprises the measurement of the factor which is a derivative of the speed retardation, and consequently the variation in torque, by controlling the measurable characteristics of an electric current, and indicating the degree of control.

In order to simplify the description of my invention, a device susceptible of carrying the same into effect has been illustrated rather diagrammatically in the accompanying drawing. It will be appreciated, in view of the principles herein involved, that numerous diversifications and modifications in the actual structure will readily suggest themselves to those skilled in the art. As shown in the drawing, the invention may be embodied in a unit comprising a base 1, which may be mounted in any desired position at the end of a ramp, or suitably installed in a pit, or in any other location found advantageous for the purpose of testing brakes. The base 1 is provided with a plurality of bearings 2, which journal shafts 3 and 4, which in turn support corrugated rollers 5 and 6 respectively. The rollers 5 and 6 are surfaced and are so positioned that they may be effectively used for driving a wheel of an automotive vehicle.

One end of the shaft 3 carries a sprocket wheel 7, and the corresponding end of shaft 4 carries a similar sprocket wheel 8. Passing over the sprocket wheels 7 and 8 is a suitable chain 9, which is so positioned and adjusted as to transmit rotary motion from one of the rollers to the other. The other end of shaft 3 projects beyond the bearing 2 and is connected with a device 10, portions of which vary with a variation in torque imposed thereon.

Associated with the torsion device 10 is a driven shaft 11 of a speed reduction device 12, which may be of any desired type or speed ratio. The driving shaft 13 of the speed reduction device 12 is connected by a flexible coupling 14 to the shaft 15 of an electric motor 16. The speed reduction device 12 and the motor 16 are preferably mounted on the base 1, together with the other elements of the brake tester.

It will be understood from the foregoing description that upon energizing the motor 16 the shaft 15 will be rotated, and rotary motion will be transmitted through the coupling, speed reduction device 12, torsion device 10 and shaft 3, to roller 5 and by means of the chain drive 7, 9, 8, to roller 6. The drive between rollers 5 and 6 is such that the two rollers rotate in the same direction. Thus, when a vehicle wheel is placed on the rollers, it will be rotated by the action of both rollers. To prevent the wheel running off of rollers 5 and 6 onto the driving machinery, a vertically mounted roller 17 is positioned on a shaft carried by base 1.

From the discussion hereinbefore set forth, it will be understood that the present embodiment contemplates utilizing the variation in the torque imposed on device 10 under varying load conditions imposed on the testing machine by the application of brake mechanism, to retard rotation of the wheel to vary the characteristics of electrical energy in an electrical circuit. This may be practically effected by means of the structure shown in the drawing.

As is clearly shown in Fig. 2, shaft 3 is resiliently connected to shaft 11 by means of a coil spring 18. One end of the spring 18 is fixed to shaft 3, and the other end is secured to shaft 11 in such a manner that rotary motion of shaft 11 will be translated to shaft 3. If a load is imposed on shaft 3, it will be displaced angularly with respect to shaft 11. As the load on shaft 3 is increased, the relative angular displacement will be increased.

This invention employs the angular displacement of shaft 3 relative to shaft 11 for operating a device for affecting the characteristic of electrical energy. One specific embodiment of electrical energy affecting device is clearly shown in the drawing. This device is in the form of a variable inductance 19. A sleeve 20, formed of insulating material, is fixed to shaft 3 by means of a suitable pin or screw 21. Attached to this sleeve or formed integrally therewith is a sector plate 22, also formed of insulating material. An arcuate coil 23 is secured to the sector plate 22 adjacent the curved portion thereof by means of brackets 24. A pair of collector rings 25 and 26 are positioned on the insulating sleeve 20. One of these rings is connected with one end of the coil 23 and the other ring is connected with the other end of this coil.

As clearly shown in Fig. 2 a brush holder 27 is so positioned on bearing 2 as to support brushes 28 and 29 in contact with the collector rings 25 and 26. Brush holder 27 is provided with a socket for each brush. A portion of each socket is threaded to receive a screw for adjusting the pressure exerted by a spring for forcing the brush into engagement with the collector ring with which it cooperates. Suitable leads 30 and 31 are provided for connecting the coil 23 with an electrical circuit.

A sleeve and sector plate constructed similarly to sleeve 20 and plate 22 is fixed on shaft 11. Parts similar to those of sleeve 20 are indicated by similar reference characters primed. A coil 32 is mounted on sector plate 22' by brackets 24'. The ends of this coil are connected to the rings 25' and 26'.

A brush holder 27' constructed similarly to brush holder 27 is mounted on the housing of the speed reduction device and retains brushes 28' and 29' in contact with rings 25' and 26'. Coil 32 may be connected in a circuit by the leads 30' and 31'.

While I have described a particular type of brush construction, I wish it to be clearly understood that any other type, found suitable, may be employed.

Coils 23 and 32 are positioned relatively to each other in such a manner as to be inductively coupled. It will be appreciated from the showing in the drawing that any variation in the relative angular displacement of shafts 3 and 11 will cause a corresponding variation in the relative angular position of sector plate 22 and 22' and consequently in the inductive coupling of coils 23 and 32. As shown in the several figures of the drawing, the induction of the inductor 19 is increased with an increase in the torque imposed on the torsion device 10. If it is desired however the coils 23 and 32 can be so positioned on plates 22 and 22' that the induction will be decreased with an increase in the load.

The inductor 19 may be placed in a circuit such as is diagrammatically shown in Fig. 4. This circuit includes an electron tube 33 having a filament 34, a grid 35 and a plate 36. Coil 32 is connected in the grid circuit and coil 23 is connected with a source of oscillations, indicated diagrammatically by the alternator 37. It will be appreciated that as the induction of inductor 19 is varied the E. M. F. applied to the grid will be varied. A manually operated variable condenser 38 is shunted across coil 32 for tuning the grid circuit to adjust the electron tube circuit to initial conditions.

The plate circuit includes a current indicating device 39 which may be of any desired type and a "B" battery for supplying a direct current potential to the plate 36. An "A" battery is provided for energizing the filament 34, and if desired may be connected through suitable resistors for varying the current supplied to the filament.

Upon supplying current to the filament a stream of electrons will flow from the filament to the plate, which will cause a current to flow in the plate circuit. If the filament temperature and "B" battery potential are maintained constant a variation in the inductance of inductor 19 will cause a variation in the plate current as indicated on the dial of the current indicating device 39.

Since the current flowing through the plate circuit is a function of the condition of the grid circuit and this is a function of the relative position of the coil 23 and 32, which in turn is a function of the torque and brake load, the current indicated on the dial of instrument 39 may be used to compute the torque and brake resistance in terms of other physical quantities. In the preferred form of the invention the milli-ammeter or other indicating device employed is somewhat modified; that is, the dial is calibrated so that the pointer directly indicates brake resistance in terms of retarding torque.

These calibrations may be made, as will be understood, by testing the torque of the testing unit when operating against given varying torques imposed and indicated by a suitable prony brake or other dynamometer. Since the increase in current indicated by the ammeter 45 is proportionate to the increased resistance exerted by the brake being tested, the transformation and calibration may readily be made. The actual calibration of a given unit will, of course, depend on the particular hook-up employed, the resiliency of spring 18, the size of condenser 38, the type and size of thermionic tube employed, the value and character of energy generated by the alternator 37, the potential of the "A" and "B" batteries and on the value of inductance in the circuit. The manually operable condenser 38 provides a means for adjusting the reading of the current indicating device 39 to initial conditions.

While the variable inductance has been shown associated with a particular type of electron tube circuit, I wish it to be understood that it may be positioned in various parts of the several circuits for affecting the flow of current in the plate circuit. An inductor 19 of any desired type may be associated with an alternating current circuit for varying the frequency thereof. In this instance a frequency meter 50, arranged as shown in Figure 5, is employed to indicate variations in frequency. Since the variation in frequency depends on the variation in inductance, which in turn depends upon the retardation effect of the application of brakes to the element being tested, the frequency meter can be calibrated as in the case of the current indicating device to read directly in terms of brake retardation.

Thus my invention involves broadly the measurement of the change in the character or characteristics of the electric current or energy, such as a change in current or frequency, caused by a variation of the inductance.

The mode of operation of the tester will have been appreciated from the foregoing description. When the vehicle is in testing position, so that a wheel engages the wheel rotating rollers 5 and 6, the closing of the motor circuit will cause motor 18 to effect rotation of these rollers through the interposed transmission. Upon applying the brakes to the wheel, the driving motor will rotate the wheel against the resistance of the brake, but with an increase in the torque in the transmission coresponding to the brake resistance. This increase in torque will cause a fluctuation in the torsion device located in the transmission. The fluctuation in the torsion device will effect a variation in the relative position of the coils 23 and 32. This variation will, as hereinbefore described, affect the potential applied to the grid of the electron tube to cause a variation in the current in the plate circuit which is determined by means of a current indicating device.

The brake retardation will be indicated directly on the indicating device up to a point where the vehicle wheel slips with respect to the wheel rotating means. When employed for varying the frequency of a circuit, the brake retardation will indicate directly on the dial of a frequency meter up to a point where the vehicle wheel slips relative to the driving means.

The electrical circuit unit 40 and instruments have been shown associated with the base 1 of the testing apparatus, but I wish it to be clearly understood that the electrical devices, particularly those affected by vibrations, may be placed in any suitable location remote to the testing apparatus. Also those parts of the electron tube circuit affected by stray energy may be shielded in any desired manner.

I wish it to be clearly understood that in the event the indications on the dial of the final indicating meter are not large enough, the final indicating energy can be amplified by any type of amplification system so as to obtain sufficient energy for effecting a large indication on the dial of the instrument.

It will be appreciated that I have provided a very simple and effective method of testing vehicle brakes. The apparatus employed for effecting the method of my invention involves a very simple electrical circuit, necessitating the use of electrical equipment which is standard and readily available on the market; also employment of the several simple electrical elements involved in the testing mechanism obviates the necessity of the use of a complicated mechanical dynamometer. All of the electrical elements involved in the testing device are of a type which may be very readily checked from time to time to determine the accuracy of the testing device.

While I have shown and described a particular embodiment of the invention, it is to be understood that this is given purely by way of example. As hereinbefore pointed out, the fundamental concept involved in this invention is a utilization of a mechanical effect of brake testing, and the transformation of this effect into an electrical effect, which may be used as a means of measuring the efficiency of the brake being tested. I wish it to be understood that I do not confine myself to the precise details of construction herein set forth, by way of illustration, as it is apparent that many changes and variations may be made therein by those skilled in the art without departing from the spirit of the invention, or exceeding the scope of the appended claims.

I claim:

1. A dynamometer comprising a driven shaft, a driving shaft, resilient means for coupling the power shaft to the first mentioned shaft, an element of a variable inductive coupler mounted on the first mentioned shaft, another element of the coupler mounted on the power shaft, an electron tube circuit connected to said coupler, and means for measuring the variation in frequency in the electron tube circuit, effected by variations in the coupling.

2. A dynamometer including a driving shaft and a driven shaft, a yielding member connecting the shafts, means operable by the relative movement of said shafts upon application of a load on the driven shaft for transmitting the load effect into a variation in the inductive resistance of an electrical circuit and means for impressing electric current on the circuit and means for measuring the changes in frequency of the current due to variations in the load on the driven shaft.

RAYMOND J. NORTON.